Patented Dec. 16, 1941

2,266,700

UNITED STATES PATENT OFFICE 2,266,700

CHEESE PACKAGE

Allen Abrams, Wausau, and Charley L. Wagner, Menasha, Wis., assignors to Marathon Paper Mills Company, Rothschild, Wis., a corporation of Wisconsin No Drawing. Application December 2, 1939, Serial No. 307,326

6 Claims. (Cl. 99—178)

This invention relates to a package for cheese and the method of packaging same.

In our United States Patent No. 2,077,300, April 13, 1937, we have disclosed a method for packaging natural cheese which comprises completely enclosing a mass of cheese in a sheet made of a wax-rubber composition having an initial viscosity of at least 8000 seconds (50 cc. measured on a Scott viscosimeter at 90° C.), applying pressure to said wrapped cheese to cause the sheet to adhere to the superficial surface of the mass of cheese so as to completely seal the cheese within the sheet, and curing the cheese after it is so packaged.

This cheese package has been very successful in actual practice as the wrapper prevents loss of moisture, the formation of undesirable rind on the surface of the cheese and mold growth. The wrapper is also sufficiently flexible so that as the cheese expands and contracts slightly due to drying out or to moisture changes the wrapper clings continuously to the surface of the cheese. The wrapper is also sufficiently permeable to carbon dioxide, which is evolved during the curing process, to permit the gas evolved to escape without distorting or rupturing the wrapper.

We have found, however, that over long periods of say 3 to 18 months the film of wax-rubber composition enclosing the cheese has been too permeable to carbon dioxide which is evolved during the curing of the cheese so that there occurs a fairly rapid escape of carbon dioxide from the package.

If the carbon dioxide escapes completely from the package, it may then be possible for air to penetrate the wrapper and come into contact with the cheese. Under such conditions it is our experience that some cheese may be susceptible to acquiring a bitter or foreign flavor. The degree to which this flavor may develop is apparently dependent on the type and cleanliness of the milk and the conditions of manufacturing it into cheese. Thus, some lots of cheese mad under the most favorable conditions may acquire little or no off-flavor, whereas other lots may acquire a noticeable off-flavor.

In order to reduce or eliminate the formation of this undesirable bitter surface flavor we have discovered that it is desirable and possible to maintain an atmosphere of carbon dioxide about the cheese by providing an outer secondary wrapper consisting of a sheet highly impervious to gas as compared with the primary wax-rubber film in which the cheese is wrapped. Among the sheets which are suitable for such purpose are regenerated cellulose, cellulose acetate, rubber hydrochloride sold as Pliofilm, and the like. After a package of natural cheese is produced and enclosed in a primary film or sheet consisting of a composition of wax and rubber as disclosed in our Patent 2,077,300 we wrap the package so produced with an outer secondary wrapper of a comparatively highly gas-impervious sheet material. The highly gas-impervious sheet around the outside of the package prevents rapid escape of carbon dioxide from the package, thereby keeping the mass of cheese surrounded by an atmosphere of the gas which is generated during the curing of the cheese. Furthermore, the gas-impervious sheet prevents oxygen from gaining entrance into the package, thereby preventing the rancidity on the surface of the cheese.

We have found it advantageous to use transparent gas-impervious sheets such as regenerated cellulose since, if desired, such sheet can be readily wetted without losing its strength during the packaging operation and can be more readily conformed to the contour of the package to which it is applied. The outer wrapper may be applied and wrapped in any suitable known manner and in some cases it may be sealed by heat and/or pressure so as to seal the overlapping seams in order to better retain the atmosphere of gas about the package. However, such sealing should be carried out so as to leave some opening for gas to escape and to prevent undue bloating or swelling of the package. The use of a transparent outer wrapper is also desirable inasmuch as it will produce a striking and very pleasing package, as the color of the cheese can be readily seen by the consumer. Moreover, the printing on the inner cheese wrapper is fully visible. Of course, if desired, the outer wrapper may be printed also, or instead of the inner wrapper.

We have found that natural cheese packaged in accordance with the present invention can be stored for very long periods of time, since the bitter or off-flavor is reduced materially or entirely eliminated. Our package also permits continuous curing of the cheese without substantial loss of moisture or deterioration of the quality of the cheese. We have accordingly produced a superior and highly desirable and marketable type of package.

As will be evident to those experienced in the technology of foods and food packaging, this type of package is also adaptable to other foodstuffs which deteriorate in the presence of air, and which lend themselves to such a package. Among these are comminuted meats and jellied meat products.

It is to be understood that variations and modifications of the invention can be made in accordance with the disclosure hereof and that such changes are intended to be included in the following appended claims.

We claim:

1. A package of natural cheese comprising a mass of cheese completely enclosed in a wax-rubber film surrounded by a secondary outer vented wrapper which is transparent and comparatively highly impervious to gas to retain a portion of the gas generated by the cheese and to permit the excess gas to escape.

2. A cheese package comprising cheese completely enclosed by superficially adherent, flexible, thermoplastic, stretchable, pressure-sealable sheet of a wax-rubber composition enclosed in an outer vented wrapper of transparent sheeting of regenerated cellulose to retain a portion of the gas generated by the cheese and to permit the excess gas to escape.

3. A package comprising natural cheese completely enclosed in a superficially adherent film of a wax-rubber composition and enclosed in secondary outer vented wrapper of a comparatively gas-impermeable sheet to retain a portion of the gas generated by the cheese and to permit the excess gas to escape.

4. The process of protecting cheese from mold growth, loss of moisture and development of bitter surface flavor which comprises completely enclosing the cheese with a film of wax-rubber composition, then applying an outer secondary wrapper of a comparatively gas-impermeable wrapper thereto, sealing the seams of said outer wrapper and providing a vent whereby a portion of the gas generated during the curing of said cheese will be retained as an atmosphere about the cheese and the excess gas permitted to escape.

5. A cheese package comprising a mass of cheese completely enclosed in a film made of a wax-rubber composition having an initial viscosity of at least 8,000 seconds (50 cc. measured on a Scott viscosimeter at 90° C.), surrounded by a secondary outer vented wrapper which is comparatively highly impervious to gas to retain a portion of the gas generated by the cheese and to permit the excess gas to escape.

6. A cheese package comprising a mass of cheese completely enclosed in a wax-rubber film surrounded by a secondary outer vented wrapper made of rubber hydrochloride which is comparatively highly impervious to gas to retain a portion of the gas generated by the cheese and to permit the excess gas to escape.

ALLEN ABRAMS.
CHARLEY L. WAGNER.